(12) United States Patent
Schlegel et al.

(10) Patent No.: US 11,091,165 B2
(45) Date of Patent: Aug. 17, 2021

(54) METHOD FOR ESTIMATING A PROBABILITY DISTRIBUTION OF THE MAXIMUM COEFFICIENT OF FRICTION AT A CURRENT AND/OR FUTURE WAYPOINT OF A VEHICLE

(71) Applicants: ZF Friedrichshafen AG, Friedrichshafen (DE); LUCAS AUTOMOTIVE GMBH, Koblenz (DE)

(72) Inventors: Matthias Schlegel, Blaustein (DE); Jochen Abhau, Bregenz (AT); Heinz-Joachim Gilsdorf, Donnersdorf (DE); Julian King, Rankweil (AT); Jochen Köhler, Dornbirn (AT); Horst Krimmel, Tettnang (DE); Gerhard Niederbrucker, Friedrichshafen (DE); Lara Ruth Turner, Immenstaad (DE); Volker Wagner, Ravensburg (DE); Robert Zdych, Friedrichshafen (DE); Vanessa Adler, Niederwerth (DE); Sascha Heinrichs-Bartscher, Neuwied (DE); Ralf Raffauf, Urmitz (DE); Holger Simon, Elz (DE); Walter Stein, Niederwerth (DE)

(73) Assignees: ZF FRIEDRICHSHAFEN AG, Friedrichshafen (DE); LUCAS AUTOMOTIVE GMBH, Koblenz (DE)

( * ) Notice: Subject to any disclaimer, the term of this patent is extended or adjusted under 35 U.S.C. 154(b) by 33 days.

(21) Appl. No.: 16/307,227

(22) PCT Filed: May 11, 2017

(86) PCT No.: PCT/EP2017/061264
§ 371 (c)(1),
(2) Date: Dec. 7, 2018

(87) PCT Pub. No.: WO2017/211532
PCT Pub. Date: Dec. 14, 2017

(65) Prior Publication Data
US 2019/0299997 A1 Oct. 3, 2019

(30) Foreign Application Priority Data
Jun. 7, 2016 (DE) .................... 10 2016 209 984.1

(51) Int. Cl.
*B60W 40/068* (2012.01)
*B60W 50/00* (2006.01)
*G06N 7/00* (2006.01)

(52) U.S. Cl.
CPC ...... *B60W 40/068* (2013.01); *B60W 50/0097* (2013.01); *G06N 7/005* (2013.01);
(Continued)

(58) Field of Classification Search
CPC ............... B60W 40/06; B60W 40/068; B60W 50/0097; G06N 7/005
See application file for complete search history.

(56) References Cited

U.S. PATENT DOCUMENTS

| 9,139,204 | B1 * | 9/2015 | Zhao | ....................... G01C 21/00 |
| 2004/0138831 | A1 * | 7/2004 | Watanabe | ............. B60T 8/1725 702/33 |

(Continued)

FOREIGN PATENT DOCUMENTS

| DE | 10 2007 060 652 A1 | 6/2009 |
| DE | 10 2015 109 270 A1 | 12/2015 |

OTHER PUBLICATIONS

German Search Report Corresponding to 10 2016 209 984.1 dated Mar. 23, 2017.
(Continued)

*Primary Examiner* — Peter D Nolan

*Assistant Examiner* — Demetra R Smith-Stewart
(74) *Attorney, Agent, or Firm* — Michael J. Bujold

(57) ABSTRACT

A method for estimating a probability distribution of the maximum coefficient of friction (μ) at a current and/or future waypoint (s, s*) of a vehicle. According to the method, a first probability distribution (WV1) for the maximum coefficient of friction (μ) at the waypoint (s) of the vehicle is determined by a Bayesian network from a first data set, which is, or was determined, for one, in particular current, waypoint (s) of the vehicle and which characterizes the maximum coefficient of friction (μ) at the waypoint (s) of the vehicle.

21 Claims, 5 Drawing Sheets

(52) U.S. Cl.
CPC . *B60W 2050/0051* (2013.01); *B60W 2420/42* (2013.01); *B60W 2420/52* (2013.01); *B60W 2420/54* (2013.01); *B60W 2510/20* (2013.01); *B60W 2520/10* (2013.01); *B60W 2520/105* (2013.01); *B60W 2520/125* (2013.01); *B60W 2520/14* (2013.01); *B60W 2520/26* (2013.01); *B60W 2520/28* (2013.01); *B60W 2530/20* (2013.01); *B60W 2540/30* (2013.01); *B60W 2552/15* (2020.02); *B60W 2552/20* (2020.02); *B60W 2552/30* (2020.02); *B60W 2552/40* (2020.02); *B60W 2555/20* (2020.02); *B60W 2556/50* (2020.02); *B60W 2556/65* (2020.02)

(56) References Cited

U.S. PATENT DOCUMENTS

| | | | |
|---|---|---|---|
| 2008/0249667 A1* | 10/2008 | Horvitz | B60W 40/076 701/1 |
| 2010/0250086 A1* | 9/2010 | Deng | B60W 40/068 701/82 |
| 2019/0143963 A1* | 5/2019 | Schlegel | B60W 50/0097 701/70 |

OTHER PUBLICATIONS

International Search Report Corresponding to PCT/EP2017/061264 dated Aug. 7, 2017.
Written Opinion Corresponding to PCT/EP2017/061264 dated Aug. 7, 2017.

* cited by examiner

METHOD FOR ESTIMATING A PROBABILITY DISTRIBUTION OF THE MAXIMUM COEFFICIENT OF FRICTION AT A CURRENT AND/OR FUTURE WAYPOINT OF A VEHICLE

This application is a National Stage completion of PCT/EP2017/061264 filed May 11, 2017, which claims priority from German patent application serial no. 10 2016 209 984.1 filed Jun. 7, 2016.

FIELD OF THE INVENTION

The invention relates to a method and a device for estimating a probability distribution of the maximum coefficient of friction at a current and/or at least one future waypoint of a moving vehicle.

BACKGROUND OF THE INVENTION

The detection or determination of the maximum coefficient of friction between tire and road surface or the detection of a road condition (for example, dry, wet, snowy and icy), from which a coefficient of friction can be derived, is an important prerequisite to assist the driver in his driving task and to avoid serious accidents. Generally, the assessment of the road conditions is up to the driver, who must adapt his/her driving style accordingly. Vehicle control systems such as Electronic Stability Control (ESC)/Traction Control System (TCS) or ABS (Antilock Braking System) assist the driver in stabilizing the vehicle in the limit range, to enable to driver to more easily comply with the driving task in extreme situations.

Accident prevention (active safety) is becoming increasingly important in driver assistance systems. However, its effect largely depends on the available maximum coefficient of friction. This is mainly determined by the interaction between tire, ground and intermediate medium. Wet roads, snow and ice, for instance, considerably reduce the maximum present coefficient of friction between tires and road surface compared to the coefficient of friction present on a dry road surface. Sudden changes in the coefficients of friction, such as those caused by changes in environmental conditions, can result in unstable driving situations and cause accidents. It is particularly dangerous if the driver of the vehicle approaches a curve too fast due to an incorrect assessment of the existing maximum coefficient of friction. If the maximum coefficient of friction or a probable coefficient-of-friction range is known, the vehicle can be decelerated at a distance from the curve to enable it to easily pass through. Driver assistance systems that enable this intervention, however, require knowledge of the maximum coefficient of friction at a future waypoint of the vehicle. For automated vehicles, the knowledge of the maximum coefficient of friction at a current waypoint and a future waypoint is also of importance, as these values are important parameters for computing a driving strategy (in particular a speed trajectory).

The maximum coefficient of friction can be determined using direct or indirect methods. The determination of the coefficient of friction by direct methods is effect-based and can be subdivided into direct, active and direct, passive methods. In a direct, active method, active intervention in the driving dynamics of the vehicle is performed by means of braking and/or steering. In a direct, passive method, there is no active intervention in the driving dynamics of the vehicle. Instead, there is only an observation of effects of the maximum coefficient of friction on the tire tread, vehicle and the like in the course of driving maneuvers of the vehicle, which the latter performs to achieve a predetermined navigation destination. To measure the effects of the coefficient of friction and to infer the latter therefrom with sufficient certainty, the transmission of forces at the tire is a prerequisite. The transmission of high forces is advantageous.

Indirect, cause-based methods are based on the determination of the maximum coefficient of friction using parameters that physically affect it. These may be, for instance, a tread pattern, the rubber compound of a tire, its temperature, an inflation pressure, the road surface, its temperature, its condition (e.g., snowy or wet), etc. The disadvantage is the required completeness of the physical model and the required knowledge of appropriate functional relationships. This requires a high sensory effort.

Unless explicitly stated in this description, the terms maximum coefficient of friction and coefficient of friction are used interchangeably below. Likewise, the terms distribution and probability distribution shall be regarded as synonyms.

SUMMARY OF THE INVENTION

The invention addresses the problem of specifying a method and the device for estimating a probability distribution of the maximum coefficient of friction at a current and/or future waypoint of a vehicle, which can be performed at runtime and efficiently combines both direct and indirect methods in the sense of a fusion of data.

These problems are solved by a method and a device according to the features of the independent claims. Advantageous embodiments will be apparent from the dependent claims.

In the method according to the invention for estimating a probability distribution of the maximum coefficient of friction at a current and/or future waypoint of a vehicle, a first set of data, which is determined for, for instance, a current waypoint of the vehicle, and which characterizes the maximum coefficient of friction at the current waypoint of the vehicle and is used to determine a first probability distribution for the maximum coefficient of friction at the waypoint of the vehicle. In doing so, the first probability distribution is determined by means of a Bayesian network.

The probability distribution thus generated can subsequently serve as a basis for estimating a maximum coefficient of friction at a current and/or future waypoint of a vehicle. The exact design of this estimation (for example, statistical measures such as expected value, mode or quantile) is not part of this invention.

In an expedient embodiment, a second probability distribution for the maximum coefficient of friction at the future waypoint of the vehicle is estimated from a second set of data about the future waypoint, in particular by means of a Bayesian network. Furthermore, the first and the second probability distributions are used to determine a resulting, combined probability distribution from a combination.

A Bayesian network is a directed acyclic graph, the nodes of which represent random variables and the edges of which represent conditional dependencies. As is known to those skilled in the art, every node has a conditional probability distribution that depends on the probability distribution of the predecessor nodes. The use of the Bayesian network as a meta-model permits the computation of the probability distribution of the maximum coefficient of friction at the current waypoint of the vehicle by efficiently using a variety of existing data, preferably all existing data. At the same time, these basic data are used together with a probability distribution of the maximum coefficient of friction at the future waypoint to obtain a prediction quality for the maximum coefficient of friction at the future waypoint.

From nodes and edges of the Bayesian network, a three-stage causal chain is formed; the input nodes of the Bayesian network each modeling an influencing factor on the maximum coefficient of friction, wherein output nodes depending on the maximum coefficient of friction represent an effect or an impact on the maximum coefficient of friction, and wherein conditional dependencies between an input node and the maximum coefficient of friction and the maximum coefficient of friction and an output node are represented by edges. The Bayesian network can also be formed by a multi-level causal chain, wherein the input nodes and/or the output nodes are divided into one or more hierarchical levels. A conditional probability is assigned to every input node and to every output node. These conditional probabilities can be obtained from experience or training data and/or expert knowledge.

As the first set of data (i.e., to generate the first probability distribution), one or more of the following data is processed at the current waypoint: a longitudinal and/or lateral acceleration of the vehicle; a yaw rate; wheel speed(s); estimation of the friction coefficient. These data can be provided by the sensors of the ESC or the brake. As further data, a vehicle speed can be processed. The vehicle speed is for instance determined by a radar system present in the vehicle, as this can provide the vehicle speed with very high accuracy compared to other sensors. Alternatively, the vehicle speed may also be determined from wheel speeds and/or GPS (Global Positioning System) data. A slip and/or an estimation of the friction coefficient can be processed as further data, wherein these data can be provided by a driving state observer (hereinafter "DSO"). It is further useful if an estimation of the friction coefficient based on data of the steering system or the steering system signals to be used for such purposes is processed as data at the current waypoint. It may also be useful to process data about the type of driver or driving style of the driver. Driver types could be, for example, a sporty or a leisurely type of driver, wherein this detection can be based on data from the transmission sensors, pedal change times, lateral accelerations of the vehicle, a pedal gradient of the accelerator pedal or a selected driving mode. Suitably weather data such as e.g. an external temperature, type and intensity of a precipitation, humidity and/or barometric pressure as well as historical and/or predicated data of said signals are processed. These data can be metrologically recorded in the vehicle or obtained from a weather data service, wherein the data can be received and processed by the motor vehicle via a wireless communication interface. Suitably a road topology, a roadway type (asphalt, concrete, cobblestones, gravel and the like), an intermediate layer (snow, water and the like) and/or a state of the roadway can also be processed. Data on the road topology can be taken from map data of a navigation system. The road topology includes, for example, curvatures, gradients, and the like. A type of roadway, the intermediate layer and the condition of the roadway can be detected by a camera system and/or taken from precise route data (referred to below as PRD). Instead of or in addition to the camera system, additional sensors such as radar, lidar, infrared and/or ultrasound systems can be used.

Suitably, the first sets of data are provided or determined by one or more of the following data sources: ESC/brake; radar system; camera system; lidar system; ultrasound system; infrared system; driving state observer; steering system; weather data service; PRD. Some of the data sources (ESC/brake, radar system, camera system, lidar system, ultrasound system, infrared system, driving condition observer, steering system) are data sources of the vehicle. The data are provided by the electronic control units (ECU Electronic Control Unit). Other data sources, such as the weather data service or the PRD, are data sources independent of the motor vehicle, wherein the data provided by them can be transmitted via a wireless communication interface to a computer, e.g. a central ECU, of the motor vehicle.

It is expedient if, for determining the first probability distribution from the first data sets, a prior probability distribution for the maximum coefficient of friction at the current waypoint of the vehicle is determined, if for each output node, a likelihood-probability distribution is determined based on the observation of a concrete initial value at the current waypoint, and if, in a correction step using the known Bayes formula from the prior probability distribution and relevant likelihood-probability distributions a relevant posterior probability distribution for the maximum coefficient of friction is determined and evaluated. In other words, the determination of the posterior probability distribution comprises the determination of a prior and a likelihood distribution from measured data and/or expert knowledge. The determination of the prior and likelihood-probability distributions at the current waypoint can be determined, for example, by means of a linear or non-linear regression model, which is adapted to a set of training data. In addition, expert knowledge can be included, for example, by setting coefficients of the regression model.

Expediently, the vehicle acceleration is additionally taken into consideration in the determination and/or evaluation of the likelihood-probability distribution. As a result, the quality of the estimation of the friction coefficient can be improved, since, in principle, this increases with increasing utilization of the coefficient of friction.

It may furthermore be advantageous if the evaluation of the relevant posterior probability distribution and the selection of one of the posterior probability distributions are performed by means of entropy. An evaluation of the selected posterior probability distribution can also be based on its entropy. In the present method, it is expedient if the smallest possible entropy is obtained, as then the determination of the maximum coefficient of friction at the current waypoint is the most accurate. If the entropy is high, however, the prediction quality on the maximum coefficient of friction at the current waypoint is negatively affected. Therefore, it is expedient if, in the case of a large entropy, a direct, active method is used, e.g. a targeted (wheel-specific) steering and/or braking/acceleration intervention. By increasing a force in the longitudinal and/or transverse direction, the statement quality improves at the output node of the Bayesian network. This results in an improved overall posterior probability distribution, in turn improving the prediction quality.

It is furthermore expedient if, as the second data set, one or more of the following data about the future waypoint for generating the second probability distribution is processed: data from and/or via a preceding vehicle, such as a speed of the preceding vehicle, a longitudinal and/or lateral acceleration, a yaw rate, wheel speeds, an estimation of the friction coefficient, data from the steering system; data on the driving style of the driver of a preceding vehicle or his/her subjective assessment of the environmental conditions and/or the available maximum coefficient of friction; a street topology; a kind of road surface; a road condition; a road surface; a type of intermediate medium; weather data (e.g., outside temperature, rainfall intensity, humidity, barometric pressure). These data can be determined from the sensors of the motor vehicle and/or received wirelessly from other road users or other infrastructure components. Data on the type of road surface, the road condition and the road surface can be provided, for instance, by a provider of map data. The type of intermediate medium (snow, moisture and the like) may e.g. be detected by a camera, infrared, radar, lidar and/or ultrasound system and/or provided by a weather and/or map service. General weather data can also be provided by a weather service. The data listed above can also be obtained from intelligent infrastructure components and communicated to the vehicle.

To combine the first and the second probability distribution, in particular a convex combination (convex linear combination) is performed. In the combination a projection parameter representing a measure of the preview by weighting the first and second probability distributions is processed. According to a further embodiment, the projection parameter can be selected inside and outside the vehicle depending on the determined entropy of the first and/or second probability distribution and/or the sensor technology available for determining the coefficient of friction. Optionally, the projection parameter can be chosen to be adaptive or fixed. In particular, the projection parameter may be selected depending on the number of available first and/or second number of data, for instance. The future waypoint can be chosen adaptively, especially in the case of a preceding vehicle. As a result, for example, the parameters of a vehicle in front detected by sensors can be used to determine the maximum coefficient of friction at the future waypoint or a maximum coefficient of friction itself determined by a preceding vehicle can be considered with a high degree of accuracy.

It goes without saying that more than two probability distributions can be taken into account when computing a resulting probability distribution. In that case, several projection parameters can be used to form a convex combination. This procedure is particularly useful if data about the maximum coefficient of friction at more than one projection point are available.

The invention further provides a device for estimating a probability distribution of the maximum coefficient of friction at a current and future waypoint of a vehicle. The device comprises a first means for using a Bayesian network from a first data set, which are or were determined for a, in particular current, waypoint of the vehicle and which characterize the maximum coefficient of friction at the waypoint of the vehicle, to generate a first probability distribution for the maximum coefficient of friction at the waypoint of the vehicle. Suitably the device comprises a second means for estimating a second probability distribution for the maximum coefficient of friction at the future waypoint of the vehicle from a second data set on the future waypoint, and a third means to determine a resulting probability distribution from the first and the second probability distribution, in particular by a convex combination.

The device has the same advantages as described above in conjunction with the method according to the invention.

In addition, the device may comprise further means for executing the method.

BRIEF DESCRIPTION OF THE DRAWINGS

Below, the invention is described in more detail with reference to an exemplary embodiment in the drawings. In the Figures.

DETAILED DESCRIPTION OF THE PREFERRED EMBODIMENTS

Figure 1:
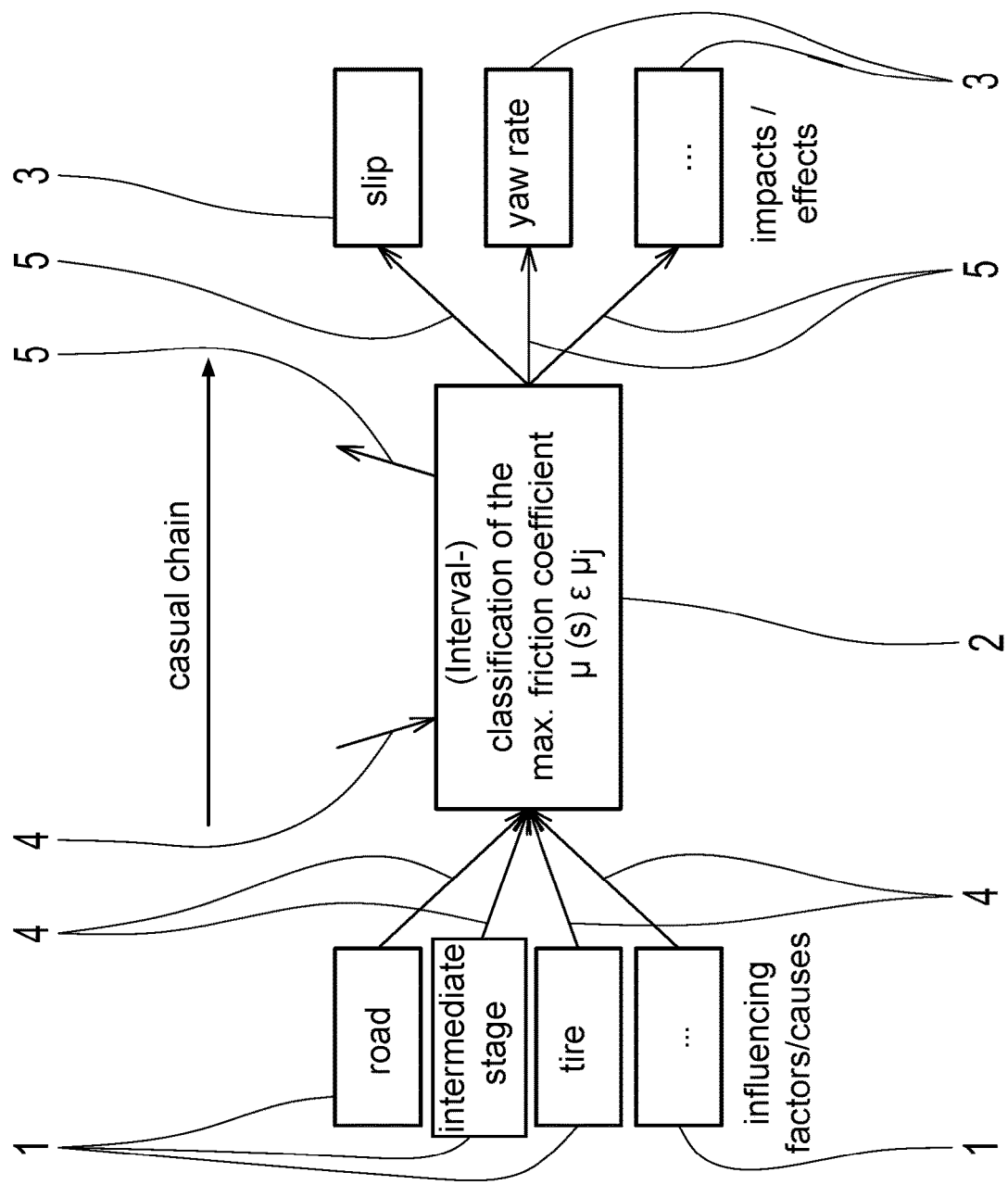
FIG. 1 shows a schematic representation of a causal chain of a meta-model of a possible Bayesian network used in the method according to the invention.

The method is based on a simplified Bayesian network, which consists of the nodes 1, 2, 3 and the edges 4, 5 and represents a three-stage causal chain, as shown in FIG. 1. The causal chain consists of influencing factors or causes u of the maximum coefficient of friction $\mu$, the maximum coefficient of friction p itself and effects or effects y, which represent outputs of the Bayesian network according to FIG. 1. Interdependencies between the nodes 1 representing the influencing factors and the node 2 representing the maximum coefficient of friction are modeled as directed edges 4. Likewise, interdependencies between the node 2 representing the maximum coefficient of friction p and the node 2 representing the max. impact are modeled as directed edges 5. It will be appreciated that the Bayesian network may also include fewer (e.g., determination of a prior probability distribution at a future waypoint described below) or more than three causal stages. The latter is particularly the case if some nodes arranged on the input side are bundled in a further plane between the nodes 1 and 2 in FIG. 1 (for example for the classification of a road surface, a tire type or an intermediate medium). The advantage of such a Bayesian network is that both data from prior knowledge and from data for determining the conditional probabilities at the nodes and thus for determining the probability distribution of the max. friction coefficient $\mu$ can be used. In particular, there is the possibility of efficiently combining different, known or novel individual concepts based on direct and indirect methods for the estimation of the friction coefficient. In addition, the modular structure allows individual nodes 1 or 3 of the network to be added or omitted, which, while influencing the quality of the estimation of the friction coefficient, does not require any conceptual changes.

Influencing factors u (i.e., node 1) on the maximum coefficient of friction $\mu$ (i.e., to node 2) are e.g. roadway (road) in terms of topology and condition, tire (tread, tire pressure, rubber compound, temperature, etc.), an intermediate medium present between the road surface and the tire (moisture, moisture, snow, ice, loose chippings, etc.) as well as the vehicle itself. Effects y (i.e. node 3) of the maximum coefficient of friction $\mu$ (i.e., of node 2) are e.g. slip, a yaw rate, a (maximum possible) acceleration and the like. In addition, there are further influencing factors u and effects y, which are not listed here.

Figure 2:
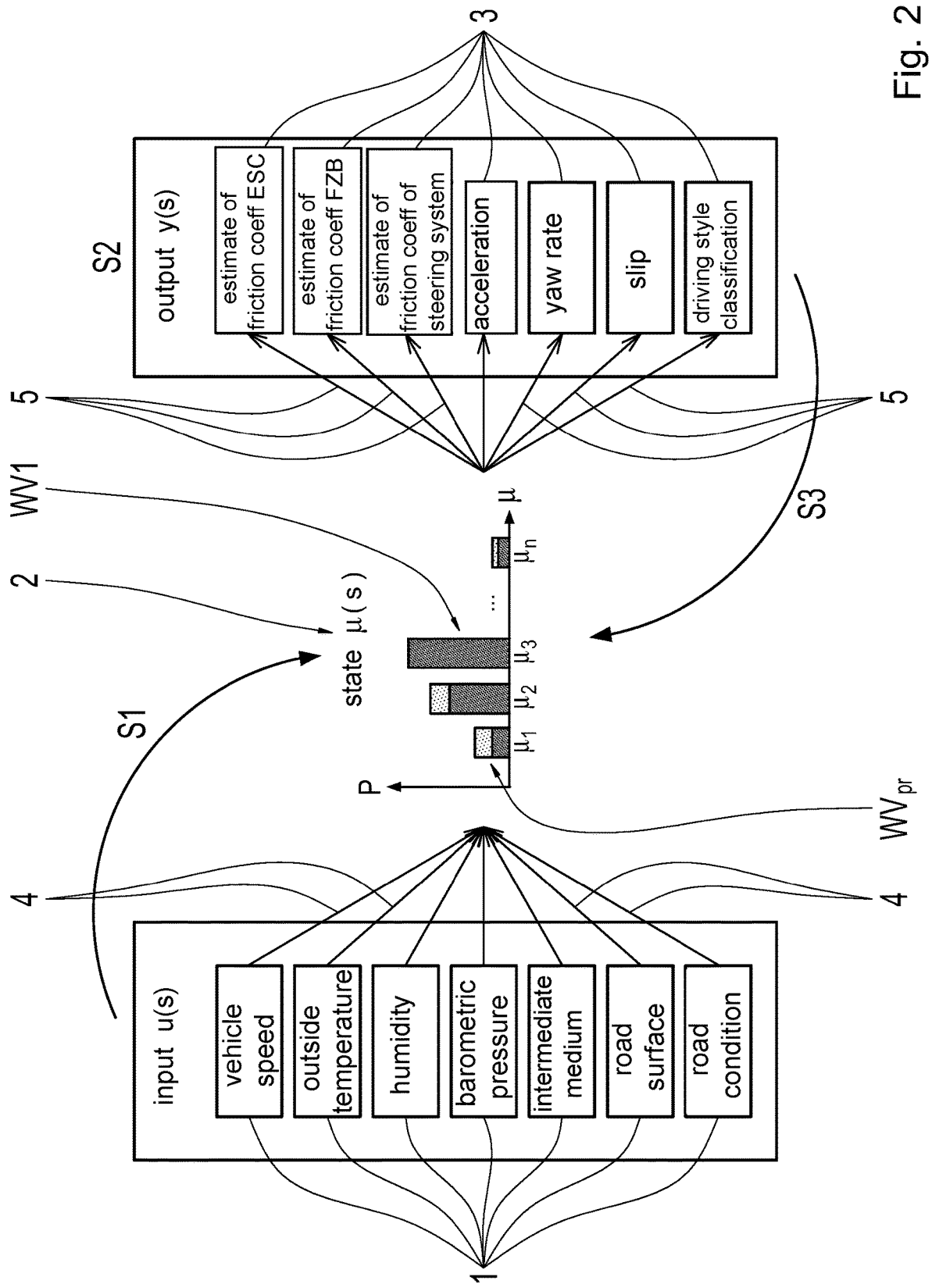
FIG. 2 shows a schematic representation of the data used by way of example in a Bayesian network.
Figure 3:
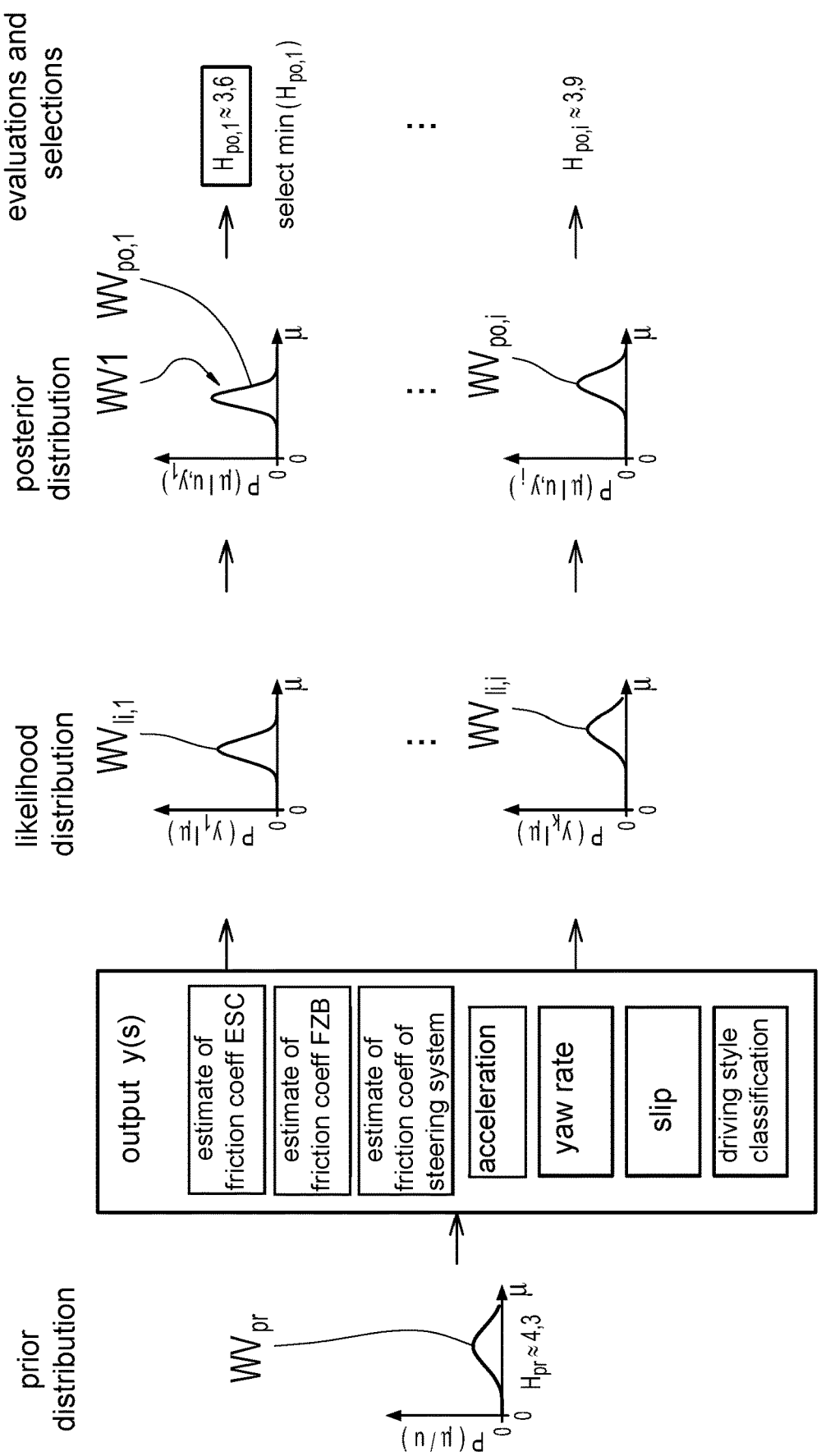
FIG. 3 shows a schematic representation of how likelihood and posterior distributions are generated from a prior distribution using a Bayesian network.

With reference to FIGS. 2 and 3, the steps to be carried out according to the invention for determining a first probability distribution, which determines the probability distribution of the maximum coefficient of friction $\mu$ below the vehicle (i.e., at a current waypoint of the vehicle), are described below. In a first step S1 of the method, prior probabilities $P_{uF,pr}(\mu(S)$ |u(s)) for the maximum coefficient $\mu$ of friction under the vehicle existing at a current waypoint s are computed based on the given inputs u. The prior distribution $WV_{pr}$ thus generated can be determined discretely or as a continuous distribution, FIG. 2 showing a discrete distribution and FIG. 3 a continuous distribution. FIG. 2 shows possible inputs u(s), which can be used to determine $WV_{pr}$.

It goes without saying that the input data u(s) shown in FIG. 2 are chosen merely by way of example. The data may be provided by sensors of the vehicle itself or by service providers outside the motor vehicle.

Data sources available in a vehicle are generally, for example, an ESC for providing accelerations, yaw rate, wheel speeds and possibly a coefficient of friction estimation, a radar system providing the vehicle speed, a driving state observer for providing an estimation of the slip and/or the coefficient of friction, a steering system for providing an estimation of the friction coefficient, a driving style rating/classification. The term estimation of the friction coefficient shall be understood as the provision of both a scalar and an interval for the maximum coefficient of friction. The evaluation or classification of a driving style can be determined for example on the basis of transmission data, pedal changing times, pedal gradients and/or transverse accelerations. It goes without saying that the relevant data are determined and provided by relevant control devices of the data sources.

The data provided by a weather data service basically include all conceivable weather data, including outside temperature, rain intensity, humidity and barometric pressure.

Topology-related data could be provided by a map provider. The topology includes inclines, curve curvatures, curve radii, roadway inclination angles, unevenness of the road, ripples in the road, potholes and the like. Such data may also include data about a road surface, road condition and type of road surface. The data about a road wetness can be provided by the combination of weather data and map data. In this context, historical as well as current and projected data are important. To determine properties of the road surface and/or an intermediate medium, additional or exclusively in-vehicle sensors such as, for example, camera, radar, lidar, infrared, ultrasound systems and/or components of an intelligent infrastructure can be used.

The determination of the prior distribution $WV_{pr}$ can be performed, for instance, with the aid of a regression model which is adapted to a sufficiently large set of training data. For instance, a linear regression can be applied. Generally, however, a non-linear simple or multiple regression model can also be used. The setting of some coefficients of the regression model represents an option for incorporating semantic expert knowledge, which does not necessarily have to be mapped in the training data.

Furthermore, in a second step S2, likelihood probabilities $P_{uF,li}(y(s)|\mu(s))$ under a given coefficient of friction $\mu$ and other parameters, such as, e.g. accelerations, are determined using another regression model based on a sufficiently large set of training data. Here, too, any regression model can be used (linear/nonlinear, simple/multinomial, parametric/non-parametric, etc.). The selection of a suitable method depends on the structure of the output data y(s). If there are continuous data, e.g. of a driving condition observer, a linear or non-linear regression is appropriate. For instance, if the source data include a driving style classification, categorical data is present. In that case, a (multinomial) logistic regression is appropriate. As described, the vehicle acceleration can be processed as a further parameter because, as a matter of principle, the quality of the estimation of the friction coefficient increases with increasing utilization of the coefficient of friction, i.e. the transmitted force on the tire. As a result, the determination of probability distributions $WV_{li,i}$ (where i=1 . . . K) for the observation of a concrete output value y(s) at the current waypoint s works for each of the k nodes 3 on the output side of the Bayesian network (see FIG. 3).

In the exemplary embodiment considered in FIGS. 2 and 3, an estimation of the friction coefficient by the ESC, a vehicle acceleration, a yaw rate, a slip, an estimation of the friction coefficient by the DSO, an estimation of the friction coefficient by the steering system and a driving style classification are regarded as outputs y(s). It goes without saying that the output data y(s) shown in FIGS. 2 and 3 are chosen merely by way of example.

The determination of the likelihood-probability distributions $WV_{li,i}$ represents an observation of the effects of the maximum coefficient of friction when the vehicle is traveling over the current waypoint. Based on these observed likelihood-probability distributions, a correction of the prior probability distribution $WV_{pr}$ determined in step S1 is conducted.

Using the Bayes Formula $$P_{uF,po,i}(\mu \in \mu_j | u, y_i) = \frac{P(y_i | \mu \in \mu_j) \cdot P(\mu \in \mu_j | u)}{\sum_j P(y_i | \mu \in \mu_j) \cdot P(\mu \in \mu_j | u)} \quad (1)$$

in a correction step (step S3) the a posteriori distributions $P_{uF,po}(\mu(s)|u(s), y(s))$ for the maximum coefficient of friction $\mu$ under the vehicle are computed from the a priori distribution $WV_{pr}$ and the relevant likelihood distributions $WV_{li,i}$ for different outputs y(s), which are designated $WV_{po,i}$ in FIG. 3 (i=1 . . . k).

In the next step, the present a posteriori distributions $WV_{po,i}$ are evaluated and one of them is selected. The a posteriori distributions $WV_{po,i}$ can be evaluated, for instance, by means of their entropy H using $$H_{po,i} = -\Sigma_j P_{uF,po,i}(\mu \in \mu_j | u, y_k) \cdot \ln P_{uF,po,i}(\mu \in \mu_j | u, y_k) \quad (2).$$

This is a first probability distribution WV1 for the max. coefficient of friction $\mu$ under the vehicle at the current waypoint s.

FIG. 3 figuratively illustrates the procedure described. There the successive sub-steps of the determination of the posterior probability distributions $WV_{po,i}$ for the maximum coefficient of friction $\mu$ under the vehicle available at the current waypoint s are shown for the given inputs and given outputs y(s). Likewise, the sub-steps of the determination of the likelihood distributions $WV_{li,i}$ and the evaluation and selection on the basis of the entropy H can be recognized. As can be seen schematically in FIG. 3, the probability distribution having minimal entropy H is selected. In FIG. 3, this is the posterior probability distribution $WV_{po,i}$ having the entropy $H_{po,i} \approx 3.6$ as shown in the uppermost row.

Figure 4:
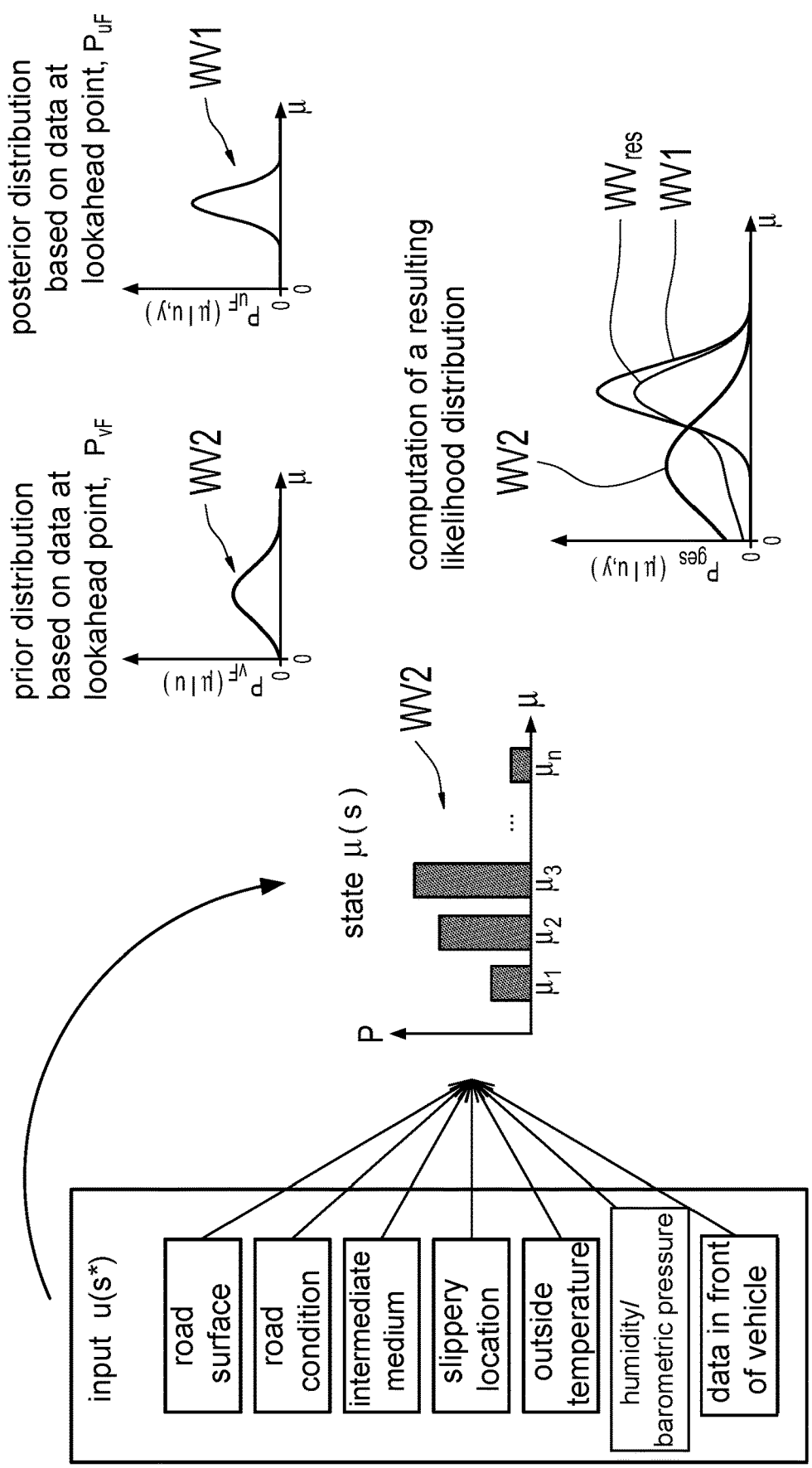
FIG. 4 shows a schematic illustration of the determination of a resulting, combined probability distribution.

In a next step (see FIG. 4), the estimation of a second probability distribution WV2 for the maximum coefficient of friction in front of the vehicle is performed at a future waypoint s*. The future waypoint is also referred to as the projection point s*. Data on the future waypoint s* can be used to specify a prior probability distribution $P_{vF,pr}(\mu(s^*)|u(s^*))$ for the maximum coefficient of friction $\mu$. These data may be, for instance, the road surface, the road condition, a possible intermediate medium (snow, moisture, rain), weather conditions (outside temperature, humidity, barometric pressure), data of a preceding vehicle, etc. The data may come from on-board sensors, other road users or an infrastructure component. The distribution WV2 obtained in this step represents a second probability distribution, which may be in discrete or continuous form, with FIG. 4 showing both. The determination of the second probability distribution $WV_{pr}$, like the determination of the prior distribution $WV_{pr}$ from step S1, can be conducted, for instance, with the aid of a regression model, which is adapted to a sufficiently large set of training data. For instance, a linear regression can be applied. Generally, however, a non-linear regression model can also be used. Setting some coefficients of the regression model represents an option for incorporating semantic expertise, which does not necessarily have to be mapped in the training data. In a final step, a computation of a resulting combined probability distribution $WV_{res}$ for the maximum coefficient of friction from the previously determined first probability distribution WV1 (cf. the procedure described in connection with FIGS. 2 and 3) and the second probability distribution WV2 for the maximum coefficient of friction at the future waypoint s*. The combination can be performed using a convex combination and a projection parameter α, where 0<α<1. The convex combination is conducted based on the equation $$WV_{res}=(1-\alpha)\cdot WV1+\alpha\cdot WV2 \quad (3)$$

The projection parameter α characterizes how far ahead the estimation looks, by weighting the first and second probability distributions WV1 and WV2. A fixed projection parameter α can be selected. It can also be determined as a function of available data, such as the entropy of WV1 and/or WV2 or the type or scope of the data at the future point s*. In that case, the projection parameter α is re-selected every time when at least one of the two probability distributions WV1 and WV2 undergoes an update.

The combination of the first probability distribution WV1 (posterior distribution based on data under the vehicle, $P_{uF}$) and the second probability distribution WV2 (prior distribution from data at the projection point, $P_{vF}$) and the computation of the resulting combined probability distribution $WV_{res}$ is illustrated in FIG. 4. By way of example, a projection parameter of α=0.3 was assumed.

In computing a resulting probability distribution from more than two probability distributions, multiple projection parameters can be used to form a convex combination. This procedure is particularly useful if data about the maximum coefficient of friction at more than one projection point are available. The equation below applies:

$$WV_{res}=\Sigma_i \alpha_{i,WVi} \text{ where } \Sigma_i \alpha_i=1 \quad (4)$$

Figure 5A:
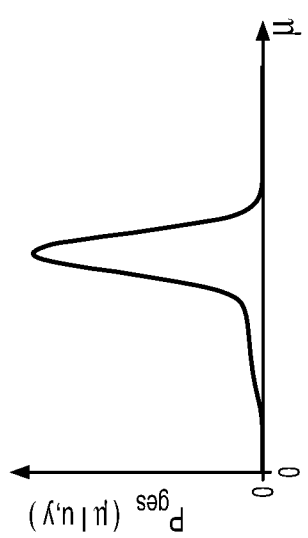
FIGS. 5a to 5b show exemplary embodiments of different resulting probability distributions.
Figure 5B:
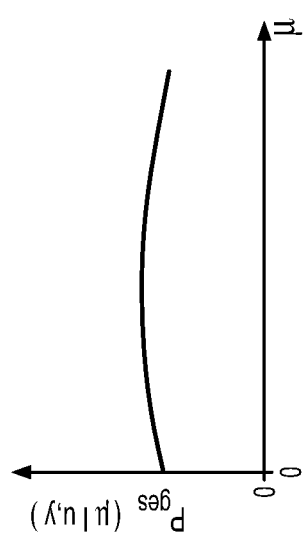

If the resulting probability distribution for the maximum coefficient of friction is not very informative (cf. the course of the probability distribution Pges (μ|u, y) in FIG. 5b), i.e. if the latter has a flat course, which can be recognized, for instance, by means of entropy, a direct, active method for determining the maximum coefficient of friction can be used, e.g. by a targeted (wheel-specific) steering and/or braking/acceleration intervention, in particular with a simultaneously briefly increased engine torque. In this way, the force transmitted to the tire is increased, which makes for an improved prediction quality at the outputs y(s). This results in a "more focused" course of a number of likelihood-probability distributions, which in turn is reflected in a "more focused" course of the resulting probability distribution as shown schematically in FIG. 5. Instead of considering the resulting probability distribution (as shown in FIG. 5), the course of the likelihood and/or posterior probability distributions for the maximum coefficient of friction under the vehicle can be used to derive a need for action in the sense of initiating a direct, active method for a more accurate estimation of the maximum coefficient of friction.

In the event that the assumption of a maximum coefficient of friction μ slowly changing along the route of travel of the motor vehicle does not apply and the probability distributions WV1 and WV2 for the maximum coefficient of friction under or in front of the vehicle, for instance, measured using an expected value, strongly differ from each other, the projection parameter α can be adjusted to determine the point of change of the coefficient of friction more precisely. Alternatively, the vehicle may be prepared for new boundary conditions at the future waypoint. This can e.g. be done based on delay, prevention of further speed increase, and the like.

REFERENCE NUMERALS 1 node
2 node
3 node
4 edge
5 edge
μ coefficient of friction
WV1 first probability distribution
WV2 second probability distribution
$WV_{res}$ resulting probability distribution
$WV_{pr}$ prior probability distribution
$WV_{li,i}$ likelihood-probability distribution where i=1 . . . k
$WV_{po,i}$ posterior-probability distribution where i=1 . . . k
α projection parameter

The invention claimed is:

1. A method for estimating a probability distribution of a maximum coefficient of friction of at least one of a current and a future waypoint of a vehicle, the method comprising:
   determining topology of a roadway of the current waypoint along which the vehicle is currently traveling as well as the future waypoint of the vehicle via map data provided by a navigation system of the vehicle;
   determining at least one characteristic of at least one tire of the vehicle via at least one tire sensor of the vehicle;
   determining a first data set for the current waypoint of the vehicle which characterizes the maximum coefficient of friction at the current waypoint of the vehicle; and
   determining, from the first data set, a first probability distribution for the maximum coefficient of friction at the waypoint of the vehicle by a Bayesian network.

2. The method of claim 1, further comprising estimating a second probability distribution for the maximum coefficient of friction at the future waypoint of the vehicle from a second data set of the future waypoint by the Bayesian network; and
   determining a resulting probability distribution using a combination of the first and the second probability distributions.

3. The method of claim 2, wherein the Bayesian network forms a multi-level causal chain, and at least one of:
   subdividing the input nodes into one or more hierarchical levels, and
   subdividing the output nodes into one or more hierarchical levels.

4. The method according to claim 2, further comprising determining the second probability distribution by processing, as the second data set, data about the future waypoint which comprises at least one of:
   data related to a preceding vehicle, data related to a driver of a preceding vehicle, road topology, type of road surface, road conditions, road surface, type of intermediate medium, weather data comprising outside temperature, rain intensity, humidity, barometric pressure, precise map data (PRD), or data from intelligent infrastructure components.

5. The method according to claim 2, further comprising performing a convex combination for combining the first and the second probability distributions (WV1, WV2).

6. The method according to claim 5, further comprising, during the combination, processing a projection parameter ($\alpha$) which represents a measure of a preview by weighting the first and the second probability distributions (WV1, WV2).

7. The method according to claim 6, further comprising processing at least one further projection parameter ($\alpha$) in the combination.

8. The method according to claim 6, further comprising selecting the projection parameter ($\alpha$) as a function of at least one of:
   a determined entropy of a relevant probability distribution; and
   data of a sensor of the vehicle available for determination of the maximum coefficient of friction ($\mu$).

9. The method according to claim 2, further comprising processing, in addition to the second probability distribution for the maximum coefficient of friction ($\mu$) at the future waypoint (s*), one or more further probability distributions for the maximum coefficient of friction ($\mu$) at one or more further future waypoints (s*) to determine the resulting probability distribution for the maximum coefficient of friction ($\mu$).

10. The method according to claim 1, further comprising forming a three-stage causal chain from nodes and edges of the Bayesian network, wherein
    input nodes of the Bayesian network each represent a factor influencing the maximum coefficient of friction,
    output nodes, which depend on the maximum coefficient of friction, represent either an impact or an effect of the maximum coefficient of friction, and
    any conditional interdependence, between the input node and either the maximum coefficient of friction or the maximum coefficient of friction and the output node, is represented by the edges.

11. The method according to claim 1, further comprising assigning a conditional probability to every node of the Bayesian network.

12. The method according to claim 1, further comprising defining at least one of the first data set and a second data set as:
    at least one of a longitudinal and a lateral acceleration of the vehicle, yaw rate, wheel speed(s), of estimation of a friction coefficient due to longitudinal dynamics of the vehicle;
    vehicle speed;
    slip;
    estimation of a friction coefficient based on lateral dynamics of the vehicle;
    estimation of a friction coefficient based on a combination of the longitudinal and the lateral dynamics of the vehicle;
    type of driver or driving style;
    outside temperature, intensity of rain, humidity, or barometric pressure
    moisture on road surface, type and condition of roadway or type of intermediate medium.

13. The method according to claim 1, wherein at least one of the first data set and a second data set being either provided or determined from one or more data sources, the data sources being:
    electronic stability control/brake, radar, camera, lidar, ultrasound, infrared system, driving state observer, steering system, weather data service, precise map data, and intelligent infrastructure components.

14. The method according to claim 1, further comprising determining a prior probability distribution for the maximum coefficient of friction for determining the first probability distribution from the first data set;
    for each output node, determining from the first data set a likelihood-probability distribution from an observation of a concrete output value at the current waypoint;
    for at least some output nodes, determining, in a correction step, a relevant posterior probability distribution for the maximum coefficient of friction using a Bayes formula from the prior probability distribution and the likelihood-probability distribution.

15. The method of claim 14, further comprising evaluating a relevant posterior probability distribution for the maximum coefficient of friction.

16. The method of claim 14, further comprising performing an additional consideration of vehicle acceleration in at least one of the determination and evaluation of the likelihood-probability distribution.

17. The method according to claim 16, further comprising performing evaluation of the relevant posterior probability distribution and selection of one of the posterior probability distributions by an entropy.

18. The method according to claim 1, further comprising selecting the future waypoint to be adaptive.

19. A method for estimating a probability distribution of a maximum coefficient of friction of at least one of a current and a future waypoint of a vehicle, the method comprising:
    determining a first data set for the current waypoint of the vehicle which characterizes the maximum coefficient of friction at the current waypoint of the vehicle; and
    determining, from the first data set, a first probability distribution for the maximum coefficient of friction at the waypoint of the vehicle by a Bayesian network;
    determining a prior probability distribution for the maximum coefficient of friction for determining the first probability distribution from the first data set;
    for each output node, determining from the first data set a likelihood-probability distribution from an observation of a concrete output value at the current waypoint;
    for at least some output nodes, determining, in a correction step, a relevant posterior probability distribution for the maximum coefficient of friction using a Bayes formula from the prior probability distribution and the likelihood-probability distribution;
    performing an additional consideration of vehicle acceleration in at least one of the determination and evaluation of the likelihood-probability distribution;
    performing evaluation of the relevant posterior probability distribution and selection of one of the posterior probability distributions by an entropy; and
    for a large entropy, carrying out at least one of a targeted steering intervention and either a wheel-specific, braking or acceleration intervention.

20. A device for estimating a probability distribution of a maximum coefficient of friction of at least one of a current and a future waypoint of a vehicle, the device comprising:
    means for determining a topology of a roadway of the current waypoint along which the vehicle is currently traveling as well as the future waypoint of the vehicle, via map data provided by a navigation system of the vehicle;

means for determining at least one characteristic of at least one tire of the vehicle via at least one tire sensor of the vehicle;

a first means to generate a first probability distribution for the maximum coefficient of friction at the current waypoint of the vehicle by a Bayesian network from a first data set, which either is or was determined for the current waypoint of the vehicle and which characterizes the maximum coefficient of friction at the current waypoint of the vehicle.

21. The device according to claim 20, further comprising:

a second means for estimating a second probability distribution for the maximum coefficient of friction at the future waypoint of the vehicle from a second data set of the future waypoint, using the Bayesian network; and a third means for determining a resulting probability distribution by a combination of the first and the second probability distribution.

* * * * *